United States Patent [19]
Fujii

[11] Patent Number: 5,303,270
[45] Date of Patent: Apr. 12, 1994

[54] FRAME GUARD SYSTEM
[75] Inventor: Hironori Fujii, Hino, Japan
[73] Assignee: Kabushiki Kaisha Toshiba, Kawasaki, Japan
[21] Appl. No.: 851,555
[22] Filed: Mar. 13, 1992
[30] Foreign Application Priority Data
  Mar. 15, 1991 [JP] Japan .................................. 3-074290
[51] Int. Cl.⁵ .............................................. H04L 7/00
[52] U.S. Cl. ..................................... 375/114; 375/116; 370/105.1; 370/105.4
[58] Field of Search ............................ 375/114, 116; 370/105.1, 105.4, 106

[56] References Cited
U.S. PATENT DOCUMENTS
  4,748,623 5/1988 Fujimoto .................. 375/116
  4,965,814 10/1990 Yoshida et al. ........... 375/111
  5,014,272 5/1991 Yoshida .................. 375/114 X Primary Examiner—Curtis Kuntz
Assistant Examiner—Tesfacdet Bocure
Attorney, Agent, or Firm—Finnegan, Henderson & Farabow, Garrett & Dunner

[57] ABSTRACT

A frame guard system comprises forward and backward guard circuits respectively having different guard stage numbers. A time after output of a frame alignment signal until first arrival of a pseudo out-of-frame signal is measured and the guard stage number of the forward guard circuit is switched in accordance with the measured time; whereas, a time after stoppage of the output of the frame alignment signal until first arrival of a pseudo synchronization signal is measured and the guard stage number of the backward guard circuit is switched in accordance with the measured time. In this way, since the respective guard stage numbers of the forward and backward guard circuits can be changed depending on a situation, the out-of-frame state after the determination of the synchronization can be prevented and thus a stable communication can be realized at all times.

8 Claims, 8 Drawing Sheets

FIG. 4(a) FRAME SYNCHRONIZATION DETECTION RESULTS

FIG. 4(b) SIGNAL 50

FIG. 4(c) SIGNAL 60

FIG. 4(d) FRAME ALIGNMENT SIGNAL (SIGNAL 200)

FIG. 4(e) FRAME PROTECTION OPERATION

FRAME GUARD SYSTEM

BACKGROUND OF THE INVENTION

1. Field of the Invention

The present invention relates to a frame guard system for preventing a failure of framing or an out-of-frame state occurring after the framing takes place.

2. Description of the Related Art

Conventionally, in such a frame guard system in a receiver of a mobile telephone, the number of frame guard stages has been fixed. The frame guard is divided into a forward guard and a backward guard. When the guard stage number in the backward guard is small, the framing is quickly done but easy to be in the out-of-frame state after the framing takes place. When the guard stage number in the backward guard is large, the framing by a pseudo frame synchronization signal does not occur but the framing tends to be delayed.

When the forward guard stage number is small, the presence of a small number of the out-of-frame bits causes the signal to tend to be out-of-frame, with a result that the communication becomes unstable. When the forward guard stage number is large, the frame is prevented from being out-of-frame for even a small number of the out-of-frame bits, but a frame alignment signal tends not to be stopped even in the out-of-frame state. In this case, the frame alignment signal refers to a signal that a frame guard system is to externally output as its final guard result.

In particular, when such a moving object as a mobile telephone moves into a tunnel or the shade of a mountain where the moving object can weakly receive an electromagnetic wave signal, a level in its received signal is abruptly decreased, which leads to the fact that the out-of-frame state is unfavorably caused immediately after the framing takes place.

In other words, the prior art frame guard system has had such a disadvantage that, since the respective guard stage numbers of the forward guard and the backward guard are fixed, the framing is deteriorated or the out-of-frame is unfavorably caused immediately after the framing is carried out, depending on a situation.

As explained above, the prior art frame guard system has such a problem that, since the frame guard stage number of the frame guard system used in a receiver of a mobile telephone is fixed, the frame synchronization tends to be easily in the out-of-frame state, which results in that the communication becomes unstable and thus a stable communication cannot be realized at all times.

SUMMARY OF THE INVENTION

It is an object of the present invention to provide a frame guard system which can eliminate the above problem in the prior art and can offer a stable communication at all times.

In accordance with the present invention, a frame synchronization is detected from a received input signal, a time between a frame alignment signal output to outside and a pseudo frame synchronization signal or a pseudo out-of-frame signal is measured, and on the basis of the measured time, the number of the forward and backward guard stages are suitably switched.

To achieve the above object, the present invention provides a frame guard system which comprises: means for extracting frame synchronization bits from a received signal and for generating a frame synchronization signal when detecting a frame synchronization from the frame synchronization bits; means from extracting the frame synchronization bits from the received signal and for generating an out-of-frame signal when failing to detect the frame synchronization from the frame synchronization bits; backward guard means for outputting a frame alignment signal when the frame synchronization signal is applied continuously by a first predetermined number of times; forward guard means for stopping output of the frame alignment signal when the out-of-frame signal is applied continuously by a second predetermined number of times; first time measuring means for measuring a first time period after output of the frame alignment signal until input of the out-of-frame signal; second time measuring means for measuring a second time period after the stoppage of the output of the frame alignment signal until the input of the frame synchronization signal; first control means for controllably changing the second predetermined number of times previously set at the forward guard means depending on a length of the time measured by the first time measuring means; and second control means for controllably changing the first predetermined number of times previously set at the backward guard means depending on a length of the time measured by the second time measuring means.

DESCRIPTION OF THE PREFERRED EMBODIMENTS

Embodiments of the present invention will be explained in detail with reference to the attached drawings.

Figure 1:
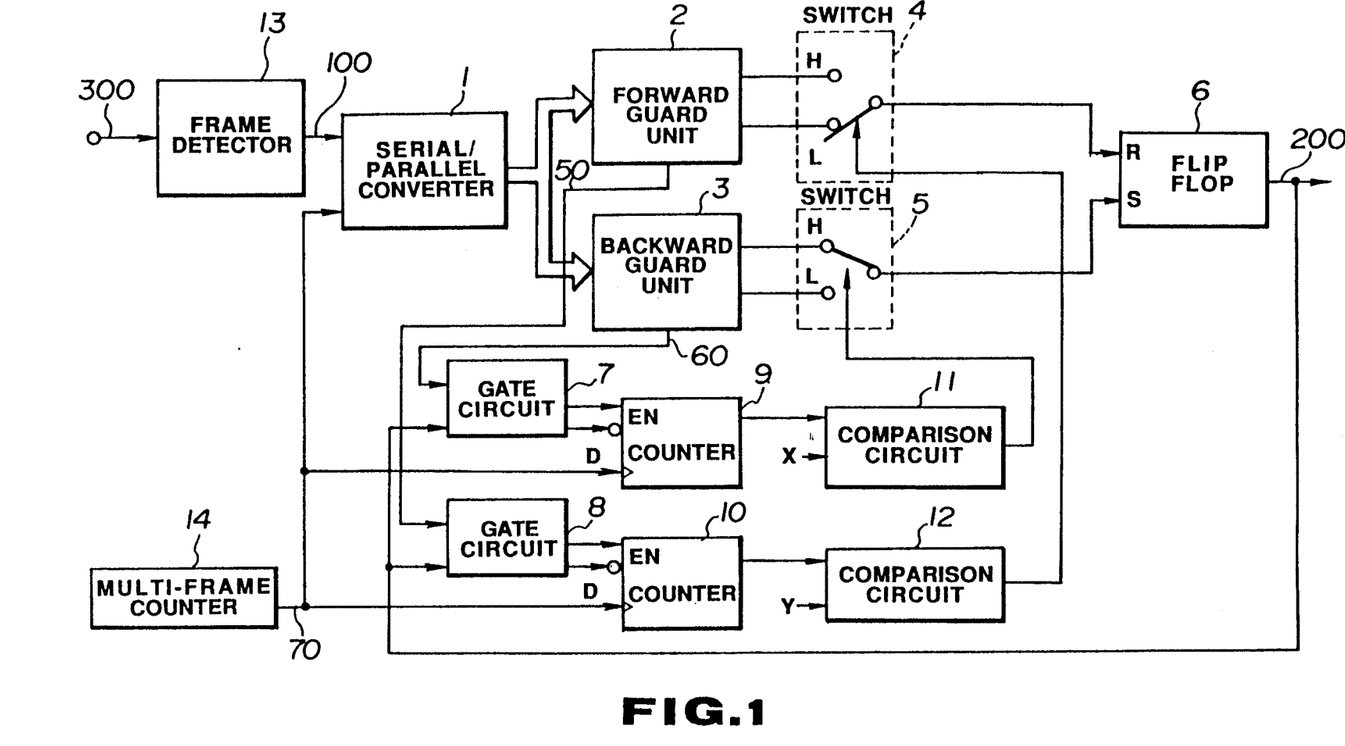
FIG. 1 is a block diagram of an arrangement of a frame guard system in accordance with an embodiment of the present invention.

Referring first to FIG. 1, there is shown a block diagram of an arrangement of a frame guard system in accordance with an embodiment of the present invention. The illustrated frame guard system comprises a frame detector 13 for extracting frame synchronization bits from a received input signal 300 to detect frame synchronization from the extracted frame synchronization bits and for outputting a high level signal as a pseudo frame synchronization signal when detecting the frame synchronization and outputting a low level signal as a pseudo out-of-frame signal when failing to detect the frame synchronization, a serial/parallel converter 1 for converting an output signal 100 of the frame detector 13 into parallel signals, a forward guard unit 2 for outputting a signal (which will be referred to as the forward guard signal, hereinafter) indicative of out-of-frame when a predetermined number of the pseudo out-of-frame signals are continuously applied to the parallel signals, a backward guard unit 3 for outputting a signal (which will be referred to as the backward guard signal, hereinafter) indicative of synchronization when a predetermined number of the pseudo frame synchronization signals are continuously applied to the parallel signals, a switch 4 for switching the number of forward guard stages in the forward guard unit 2, a switch 5 for switching the number of backward guard stages in the backward guard unit 3, a flip-flop circuit 6 for controlling the output or stoppage of a frame alignment signal 200 which the present frame guard system is to eventually output externally according to the forward or backward guard signal selectively received from the switches 4 and 5, a gate circuit 7 for opening its gate for a time period after the stoppage of the output of the frame alignment signal 200 until the arrival of the pseudo frame synchronization signal, a gate circuit 8 for opening its gate for a time period after the output of a frame alignment signal 200 until the arrival of the pseudo out-of-frame signal, a counter 9 for counting a time after the stoppage of the output of the frame alignment signal 200 until the arrival of the pseudo frame synchronization signal, a counter 10 for counting a time after the output of the frame alignment signal 200 until the arrival of the pseudo out-of-frame signal, a comparison circuit 11 for comparing a count value of the counter 9 with a reference value X to generate a change-over control signal for the switch 5, a comparison circuit 12 for comparing a count value of the counter 10 with a reference value Y to generate a change-over control signal for the switch 4, and a multi-frame counter 14 for outputting a clock 70 used for operations of the respective parts and circuits of the present frame guard system.

More specifically, the gate circuit 8 and the counter 10 constitute a first time counting means, the gate circuit 7 and the counter 9 constitute a second time counting means, the switch 4 and the comparison circuit 12 constitute a first control means, and the switch 5 and the comparison circuit 11 constitute a second control means.

Figure 2:
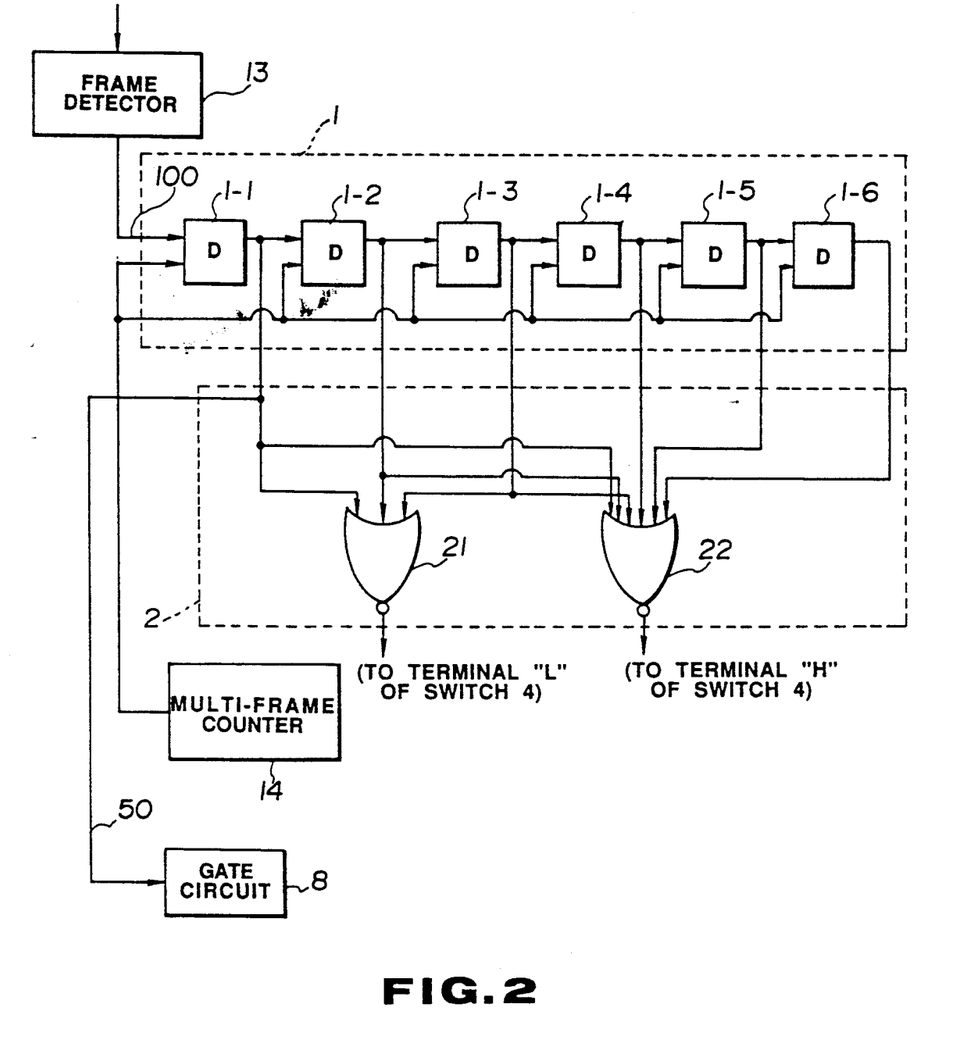
FIG. 2 is a block diagram of detailed structure of a serial/parallel converter 1 and a forward protector 2 in the circuit of FIG. 1.

Shown in FIG. 2 is a block diagram of detailed structures of the serial/parallel converter 1 and the forward guard unit 2 in the frame guard system of FIG. 1. In FIG. 2, the serial/parallel converter 1 comprises 6 stages of registers 1-1 to 1-6, while the forward guard unit 2 comprises NOR gates 21 and 22. In more detail, the NOR gate 21, which functions to decrease the number of forward guard stages, is arranged to output a high level signal when the registers 1-1 to 1-3 all hold the low level signals; whereas, the NOR gate 22, which functions to increase the number of forward guard stages, is arranged to output a high level signal when the registers 1-1 to 1-6 all hold the low level signals.

Figure 3:
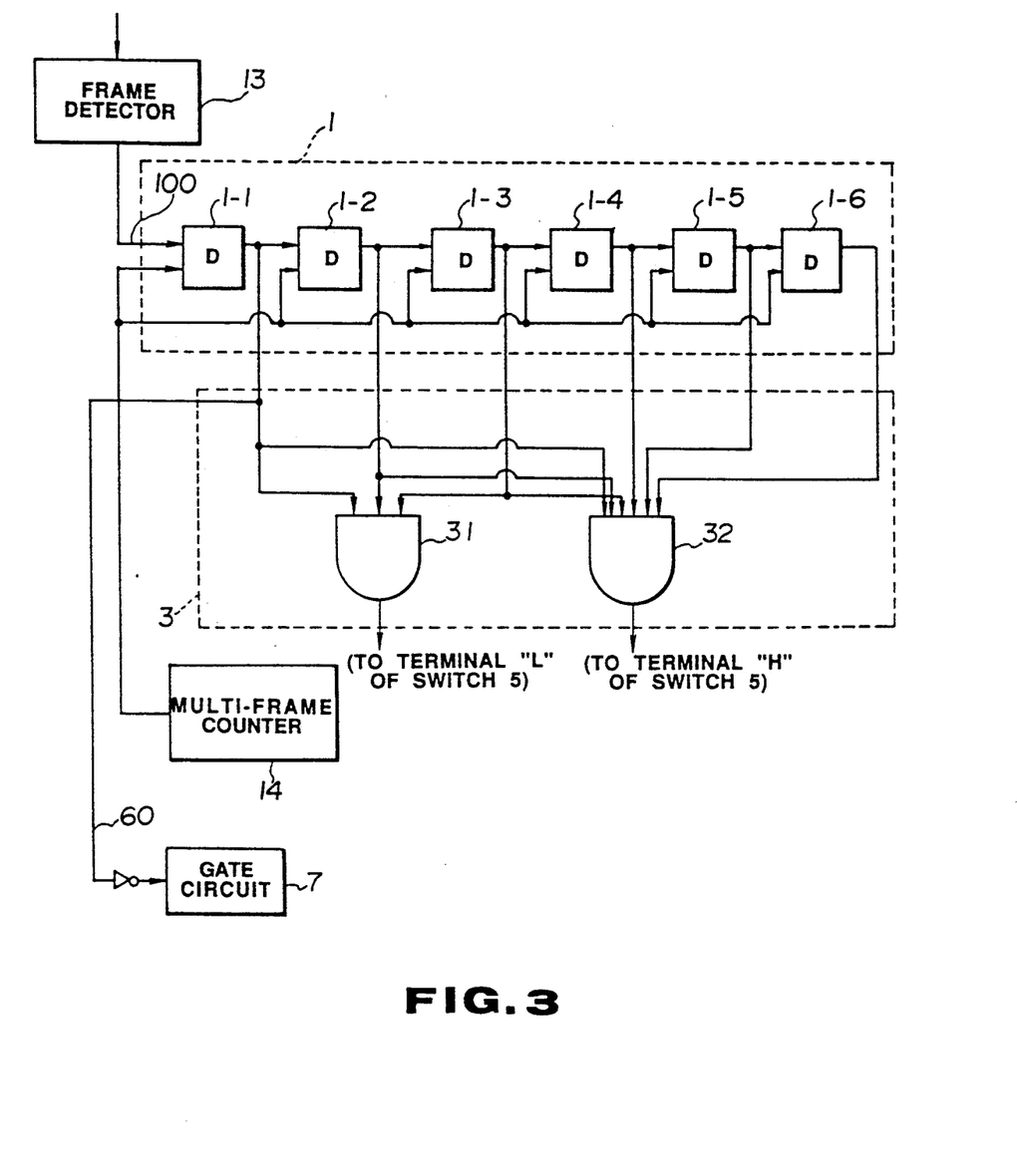
FIG. 3 is a detailed arrangement of the serial/parallel converter 1 and a backward protector 3 in the circuit of FIG. 1.

FIG. 3 shows a block diagram of detailed structures of the serial/parallel converter 1 and the backward guard unit 3 in the frame guard system of FIG. 1. More specifically, the serial/parallel converter 1 comprises 6 stages of the registers 1-1 to 1-6, while the backward guard unit 3 comprises AND gates 31 and 32. The AND gate 31, which functions to decrease the number of backward guard stages, is arranged to output a high level signal when the registers 1-1 to 1-3 all hold the high level signals; whereas, the AND gate 32, which functions to increase the number of backward guard stages, is arranged to output a high level signal when the registers 1-1 to 1-6 all hold the high level signals.

Explanation will next be made as to the operation of the present embodiment. First, in an out-of-frame state, the number of the backward guard stages in the backward guard unit 3 is set to be large, that is, the switch 5 is switched to its terminal H. Under this condition, when the output signal 100 of the frame detector 13 is applied to the serial/parallel converter 1, the signal 100 is converted to parallel signals which in turn are applied to the forward guard unit 2 and to the backward guard unit 3. In this case, the signal 100 is composed of the pseudo out-of-frame signal of low level and the pseudo frame synchronization signal of high level. FIG. 3 shows, as already explained above, the block diagram of the detailed structures of the serial/parallel converter 1 and the backward guard unit 3, in which case 6 of the high level pseudo frame synchronization signals are continuously applied to the serial/parallel converter 1, the registers 1-1 to 1-6 holding these high level signals respectively. At this time, the AND gate 32 outputs a high level signal to a set terminal S of the flip-flop circuit 6 through the terminal H of the switch 5. This causes the flip-flop circuit 6 to be set so as to externally output from its output terminal the high level frame alignment signal 200 that is also applied to the gate circuits 7 and 8.

When the number of backward guard stages in the backward guard unit 3 is small, on the other hand, the switch 5 is switched from its terminal H to a terminal L so that, as soon as the registers 1-1 to 1-3 in FIG. 3 all hold the high level pseudo frame synchronization signals, the AND gate 31 issues a high level signal through the terminal L of the switch 5 to the set terminal S of the flip-flop circuit 6, which in turn outputs the high level frame alignment signal 200 to the external circuit and the gate circuits 7 and 8.

When the frame alignment signal 200 becomes high in level, this causes the gate circuit 8 to be opened and the gate circuit 7 to be closed. When the gate circuit 8 is opened, a high level control signal 50 is applied to an enable terminal EN of the counter 10 through the gate circuit 8 as long as the pseudo frame synchronization signal is input from the forward guard unit 2. As a result, the counter 10 starts to count the clock 70 as the output of the multi-frame counter 14 and sends a counted value to the comparison circuit 12. Thereafter, when the forward guard unit 2 first receives the pseudo out-of-frame signal, the control signal 50 is changed to its low level and the counter 10 is reset. So long as the counted value of the counter 10 does not exceed a reference value Y, the switch 4 is switched to its terminal L so that the number of forward guard stages in the forward guard unit 2 is set at its small value; whereas, once the counted value of the counter 10 exceeds the reference value Y, the switch 4 is switched to the terminal H to change the forward guard stage number to the large value.

Figures 4A, 4B:
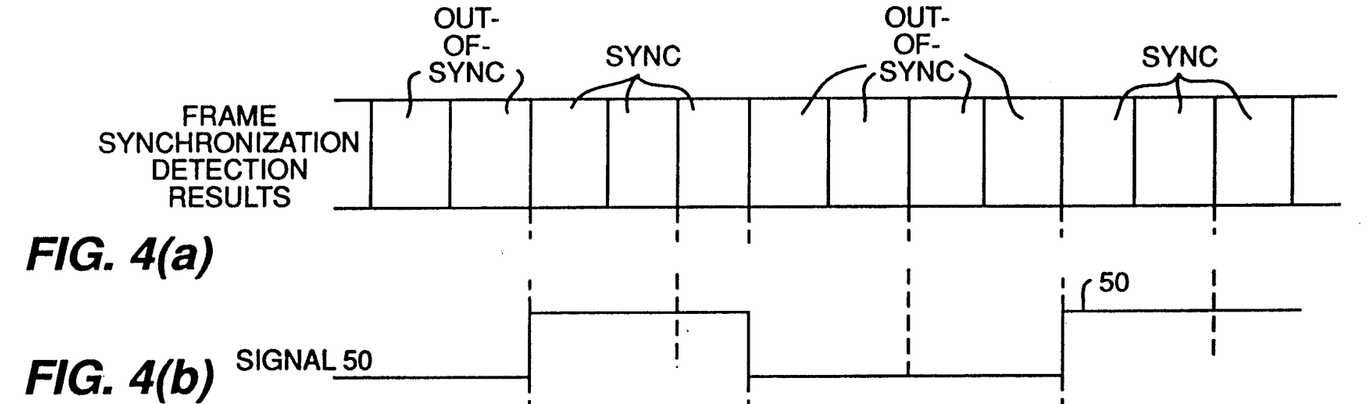
FIGS. 4(a)-(c) shows waveforms of signals for explaining the frame guard operation of the circuit of FIG. 1.
Figure 4C:
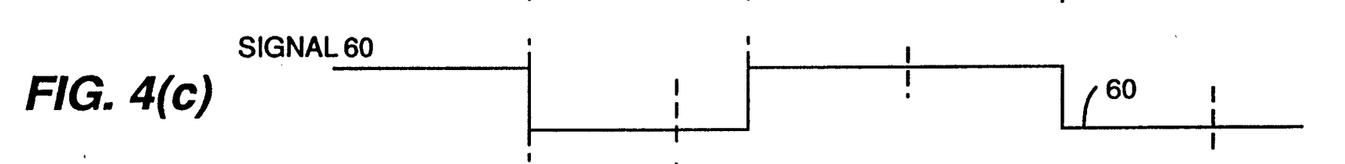
Figures 4D, 4E:
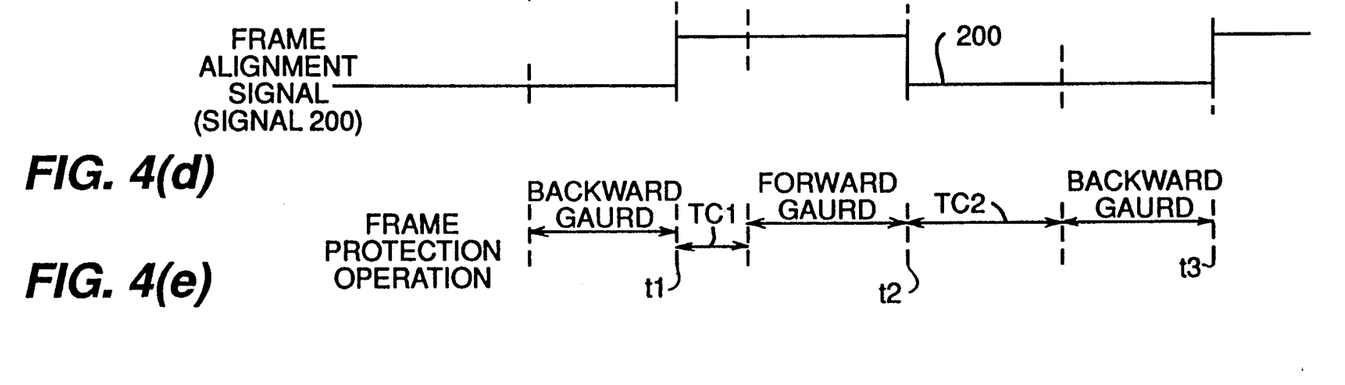

Referring to parts (a) to (e) of FIG. 4, there are shown waveforms of signals for explaining the operation of the frame guard system of FIG. 1. The part (a) of FIG. 4 shows frame synchronization detection results of the frame detector 13, the part (b) of FIG. 4 shows the control signal 50 issued from the forward guard unit 2, the part (c) of FIG. 4 shows a control signal 60 issued from the backward guard unit 3, the part (d) of FIG. 4 shows the frame alignment signal 200 as the output of the flip-flop circuit 6, and the part (e) of FIG. 4 shows count durations of the counters 9 and 10 based on the forward and backward guard units 2 and 3.

As shown in the drawing, since 3 of high level pseudo frame synchronization signals are continuously applied to the AND gate 31 at a time point t1, the backward guard unit 3 sends a high level signal through the terminal L of the switch 5 to the flip-flop circuit 6, whereby the flip-flop circuit 6 outputs the high level frame alignment signal 200. As a result, the gate circuit 8 is opened and the counter 10 starts to count a duration TC1 shown in the part (e) of FIG. 4. If the duration TC1 is longer than the reference value Y applied to the comparison circuit 12, then the switch 4 is switched to the terminal H so that the guard stage number of the forward guard unit 2 is changed to the larger one. On the contrary, when the duration TC1 is shorter than the reference value Y, the switch 4 is switched to the terminal L so that the guard stage number of the forward guard unit 2 is changed to the smaller one.

When the guard stage number of the forward guard unit 2 is small, as soon as the registers 1-1 to 1-3 in FIG. 2 hold the low level pseudo out-of-frame signals, the NOR gate 21 issues a high level signal which is applied through the terminal L of the switch 4 to a reset terminal R of the flip-flop circuit 6, thus resetting the flip-flop circuit 6. This results in that the frame alignment signal 200 so far issued as the output of the flip-flop circuit 6 is changed to its low level. When the guard stage number of the forward guard unit 2 is large, as soon as all the registers 1-1 to 1-6 hold the low level pseudo out-of-frame signals, the NOR gate 22 issues a high level signal which is applied through the terminal H of the switch 4 to the reset terminal R of the flip-flop circuit 6, whereby the frame alignment signal 200 so far issued as the output of the flip-flop circuit 6 is changed to its low level. The change of the frame alignment signal 200 to its low level causes the gate circuit 7 to be opened and the gate circuit 8 to be closed. Since the gate circuit 7 is opened and the control signal 60 issued from the backward guard unit 3 is at the high level while receiving the pseudo out-of-frame signal, the high level control signal 60 flows through the gate circuit 7 to the enable terminal EN of the counter 9. As a result, the counter 9 starts to count the clock 70 from the multi-frame counter 14 and sends a counted value to the comparison circuit 11. The comparison circuit 11, when determining that the received counted value is smaller than the reference value X, causes the switch 5 to be switched to the terminal L so that the number of guard stages of the backward guard unit 3 is changed to the smaller one. When determining that the counted value exceeds the reference value X, the comparison circuit 11 causes the switch 5 to be switched to the terminal H so that the guard stage number of the backward guard unit 3 is increased.

The aforementioned operation will be explained in conjunction with FIG. 4. As shown in FIG. 4, since three of the pseudo out-of-frame signals are present at a time point t2, the NOR gate 21 of the forward guard unit 2 sends a high level signal to the terminal R of the flip-flop circuit 6 whereby the frame alignment signal 200 becomes low level. At the time point t2, the counter 9 starts to count a duration TC2 in the part (e) of FIG. 4. When the duration TC2 is longer than the reference value X applied to the comparison circuit 11, this causes the switch 5 to be switched to the terminal H so that the number of the guard stages of the backward guard unit 3 is changed to the large one. Conversely, when the duration TC2 is shorter than the reference value X, this causes the switch 5 to be switched to the terminal L so that the number of guard stages of the backward guard unit 3 is changed to the small one. Thereafter, in FIG. 4, the forward and backward guard stage numbers are continued to be both small until a time point t3, at which time the frame alignment signal 200 is changed again to its high level and the framing takes place.

Figure 5:
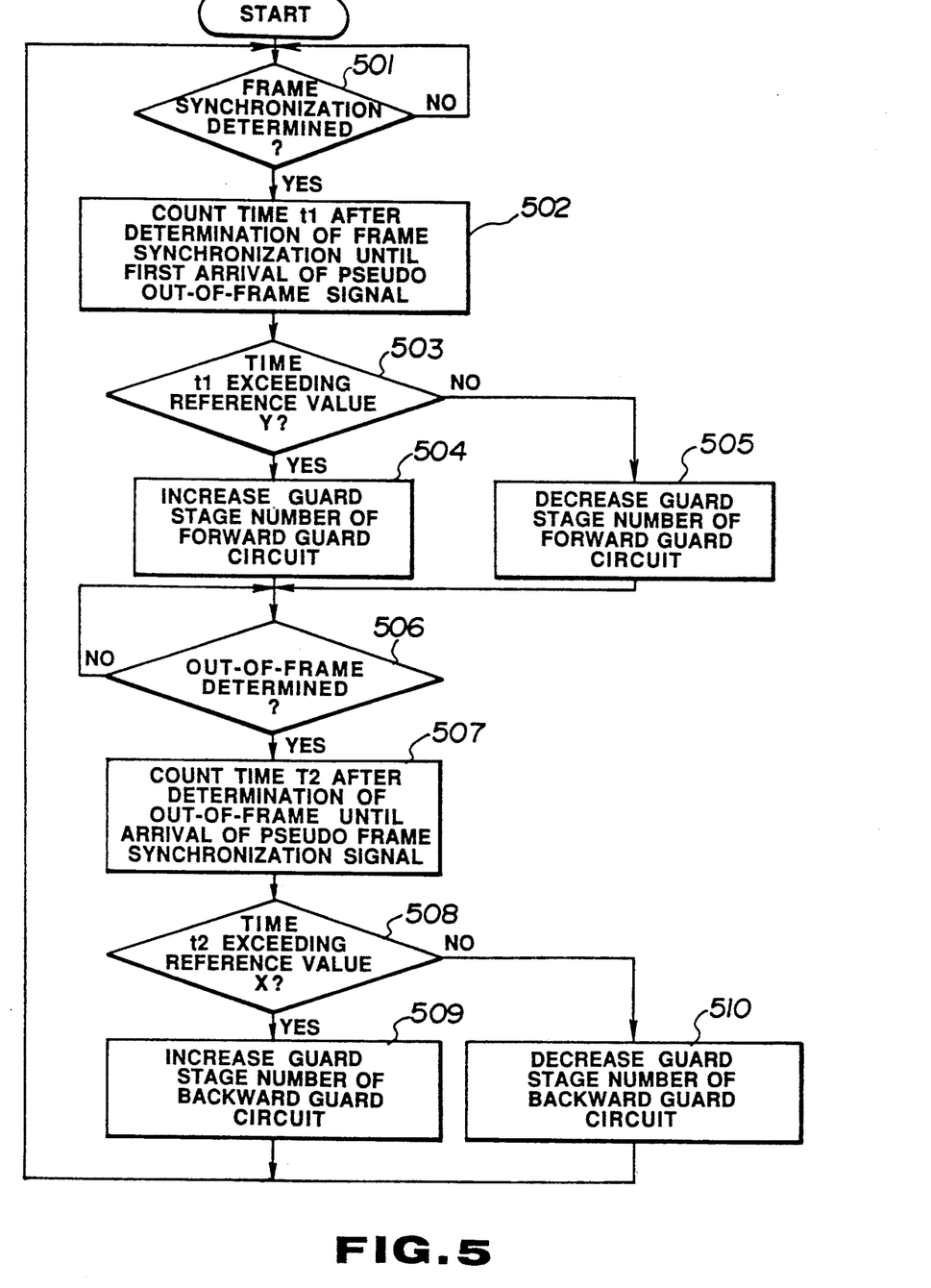
FIG. 5 is a flowchart for explaining the frame guard operation of FIG. 1.

FIG. 5 shows a flowchart for explaining the frame guard operation of the frame guard system of FIG. 1. In more detail, first, it is determined whether the frame is in synchronization (501). Then, the time t1 after the frame synchronization is determined, i.e., after the output of the frame alignment signal until the first arrival of the pseudo out-of-frame signal is measured or counted (step 502). It is judged whether the time t1 exceeds the reference value Y (step 503). If the time t1 exceeds the reference value Y, then the guard stage number of the forward guard unit 2 is increased (step 504). If the time t1 does not exceeds the reference value Y, the guard stage number of the forward guard unit 2 is decreased (step 505). After the determination of the out-of-frame state (step 506), then the time t2 after the out-of-frame is determined, i.e., after the stoppage of the output of the frame alignment signal until the first arrival of the pseudo frame synchronization signal, is measured (step 507). It is judged whether the time t2 exceeds the reference value X (step 508). When the time t2 exceeds the reference value X, the guard stage number of the backward guard unit 3 is increased (step 509); whereas, when the time t2 does not exceed the reference value X, the guard stage number of the backward guard unit 3 is decreased (step 510). After the processing of the step 509 or 510, control returns to the step 501 to repeat the aforementioned procedure.

Figure 6:
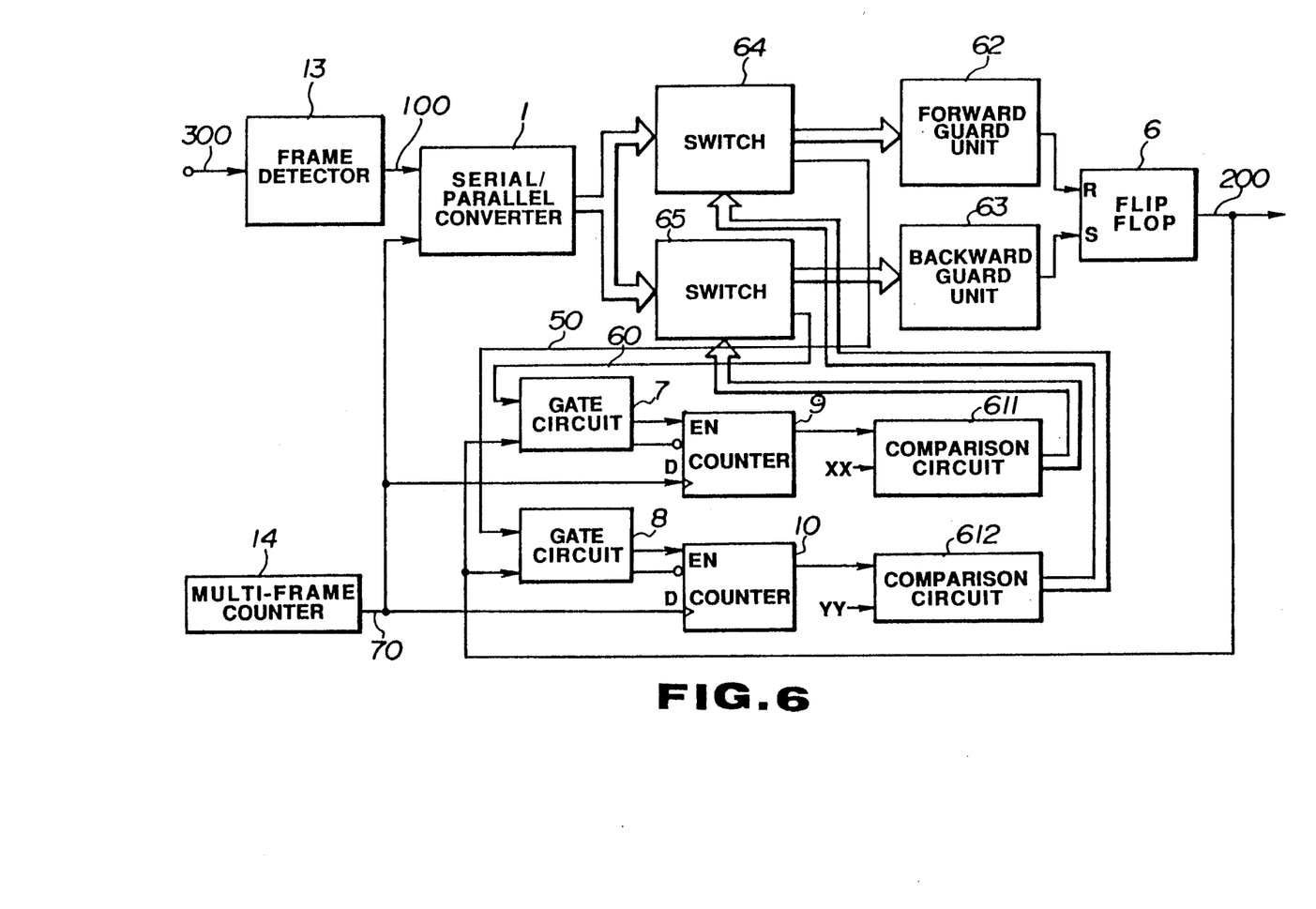
FIG. 6 is a detailed arrangement of a frame guard system in accordance with a second embodiment of the present invention.

Shown in FIG. 6 is a block diagram of an arrangement of a frame guard system in accordance with a second embodiment of the present invention. In the drawing, parts having the same structures as those in FIG. 1 are denoted by the same reference numerals. The illustrated frame guard system comprises a frame detector 13 for extracting frame synchronization bits from the received input signal 300 to detect frame synchronization from the extracted frame synchronization bits and for outputting a high level signal as the pseudo frame synchronization signal when detecting the frame synchronization and outputting a low level signal as the pseudo out-of-frame signal when failing to detect the frame synchronization, the serial/parallel converter 1 for converting the output signal 100 of the frame detector 13 into parallel signals, switches 64 and 65 for selectively switching the parallel signals at predetermined positions, a forward guard unit 62 for outputting a forward guard signal indicative of the out-of-frame state when all the parallel signals issued through the switch 64 are the pseudo out-of-frame signals, a backward guard unit 63 for outputting a backward guard signals indicative of the synchronization state when all the parallel signals issued through the switch 65 are the pseudo frame synchronization signals, the flip-flop circuit 6 for controlling the output or stoppage of the frame alignment signal 200 which the present frame guard system is to eventually output externally according to the forward or backward guard signal, the gate circuit 7 for opening its gate for a time period after the stoppage of the output of the frame alignment signal until the arrival of the pseudo frame synchronization signal, the gate circuit 8 for opening its gate for a time period after the output of the frame alignment signal until the arrival of the pseudo out-of-frame signal, the counter 9 for measuring or counting a time after the stoppage of the output of the frame alignment signal until the arrival of the pseudo frame synchronization signal, the counter 10 for counting a time after the output of the frame alignment signal until the arrival of the pseudo out-of-frame signal, a comparison circuit 611 for comparing a count value of the counter 9 with a plurality of reference values XX to generate a control signal for the switch 65, a comparison circuit 612 for comparing a count value of the counter 10 with a plurality of reference values YY to generate a control signal for the switch 64, and the multi-frame counter 14 for outputting the clock 70 used for operations of the respective parts and circuits of the present frame guard system.

Figure 7:
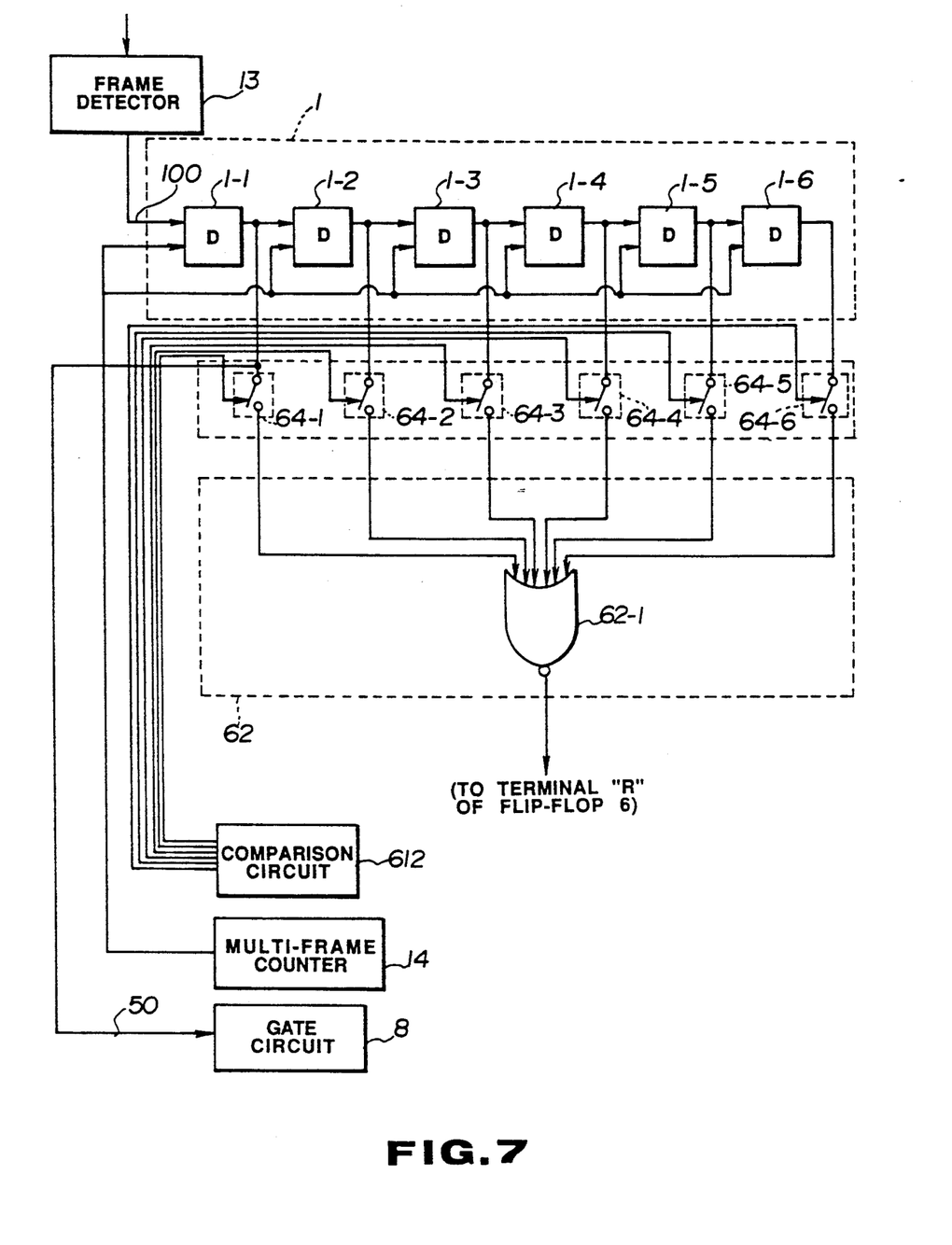
FIG. 7 is a block diagram of detailed structures of a serial/parallel converter 1, a switch 64 and a forward protector 62 in the circuit of FIG. 6.

Shown in FIG. 7 is a block diagram of detailed structures of the serial/parallel converter 1, the switch 64 and the forward guard unit 62 in the frame guard system of FIG. 6. In FIG. 7, the serial/parallel converter 1 comprises 6 stages of the registers 1-1 to 1-6, and the switch 64 comprises switches 64-1 to 64-6 which are controlled according to control signals received from the comparison circuit 612. Further, the forward guard unit 62 comprises a single NOR gate 62-1. In more detail, the NOR gate 62-1 outputs a high level signal when the registers which are connected to the switches in the ON state among the switches 64-1 to 64-6 all hold the low level signals. Here, signals from the switches in the OFF state are judged as low level signals.

Figure 8:
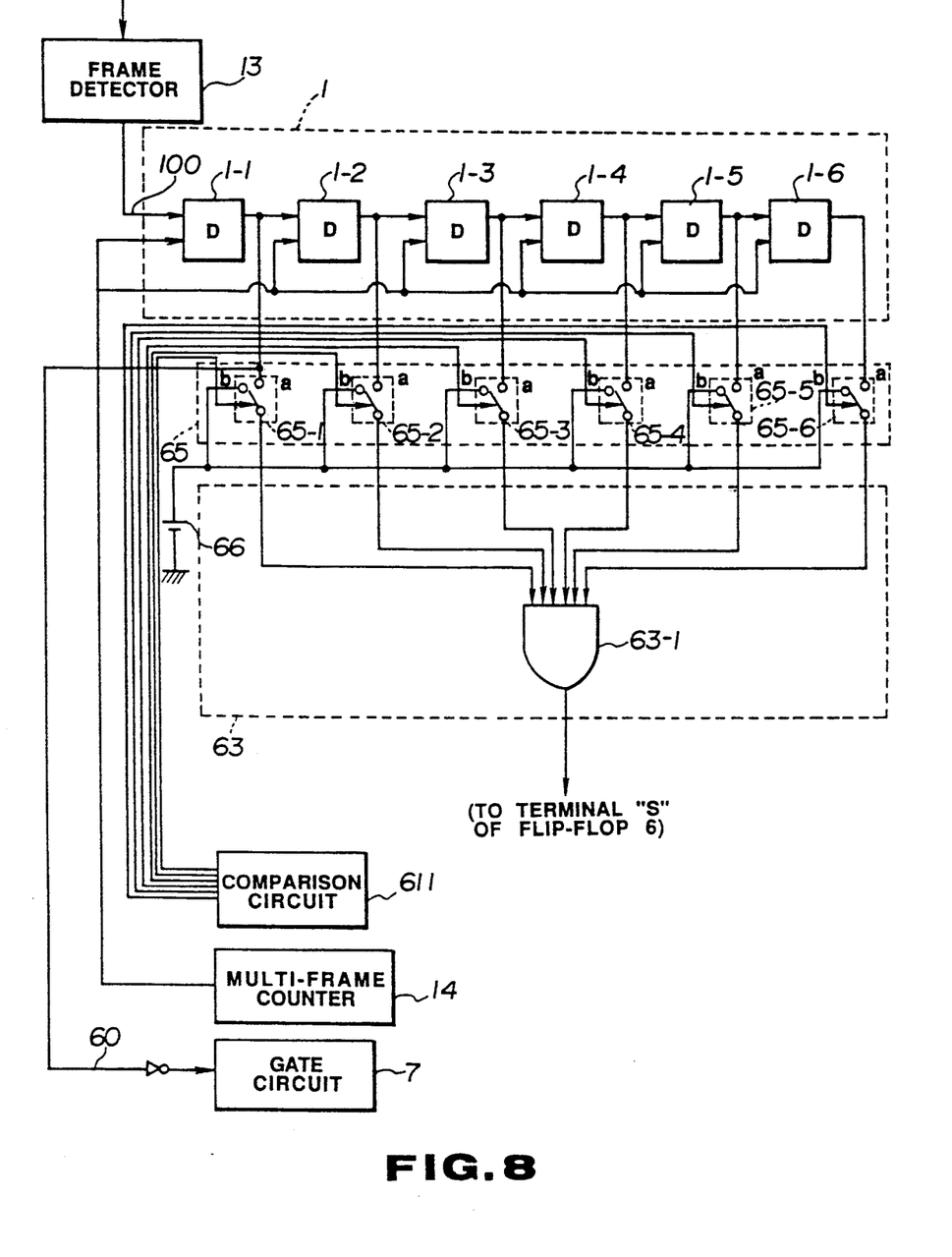
FIG. 8 is a block diagram of detailed structures of the serial/parallel converter 1, a switch 65 and a backward protector 63 in the circuit of FIG. 6.

FIG. 8 shows a block diagram of detailed structures of the serial/parallel converter 1, the switch 65 and the backward guard unit 63 in the frame guard system of FIG. 6. In FIG. 8, more specifically, the serial/parallel converter 1 comprises 6 stages of the registers 1-1 to 1-6, and the switch 65 comprises switches 65-1 to 65-6 which are controlled on the basis of control signals received from the comparison circuit 611. Further, the backward guard unit 63 comprises a single AND gate 63-1. The AND gate 63-1 outputs a high level signal when the registers which are connected to the switches in the ON state (turned to the terminal "a") among the switches 65-1 to 65-6 all hold the high level signals. Here, a high level signal from a power source 66 is applied to the AND gate 63-1 through the switches in the OFF state (turned to the terminal "b"). In other words, the forward and backward guard stage numbers can be changed to the desired ones which are within the number of registers of the serial/parallel converter 1 and are selected by the switches, and the forward guard and the backward guard can be carried out at a given position.

Explanation will next be made as to the operation of the present embodiment of FIG. 6. First, in the out-of-frame state, the backward guard unit 63 is set at a predetermined number of guard stages. For example, it is set at a 3-guard-stage when the switches 65-1 to 65-3 are in the ON state while the switches 65-4 to 65-6 are in the OFF state. Similarly, the guard stage number of the forward guard unit 62 is set at a 3-guard-stage when the switches 64-1 to 64-3 are in the ON state while the switches 64-4 to 64-6 are in the OFF state. Under this condition, when the output signal 100 of the frame detector 13 is applied to the serial/parallel converter 1, the signal 100 is converted into parallel signals. From the serial/parallel converter 1, the parallel signals are then applied to the forward guard unit 62 through the switch 64, and are also applied to the backward guard units 63 through the switch 65. In this case, when 3 of the high level pseudo frame synchronization signals are continuously applied to the serial/parallel converter 1, all the registers 1-1 to 1-3 hold the high level signals. At this time, the AND gate 63-1 of the backward guard unit 63 outputs a high level signal to the set terminal S of the flip-flop circuit 6. This causes the flip-flop circuit 6 to be set so that the flip-flop circuit outputs the frame alignment signal 200 from its output terminal to an external circuit and also to the gate circuits 7 and 8.

When the frame alignment signal 200 becomes high in level, this causes the gate circuit 8 to be opened and the gate circuit 7 to be closed. When the gate circuit 8 is opened, the control signal 50, at a high level as long as the pseudo frame synchronization signal is input from the forward guard unit 62, is applied through the gate circuit 8 to the enable terminal EN of the counter 10, whereby the counter 10 starts to count the clock 70 issued from the multi-frame counter 14 and sends its counted value to the comparison circuit 612. Thereafter, the forward guard unit 62 first receives the pseudo out-of-frame signal, which causes the control signal 50 to be changed to its low level, with the result that the counter 10 is reset so that, when the counted value of the counter 10 exceeds a specific one of the reference values YY, e.g., 5 reference values, the comparison circuit 612 outputs signals for controlling the respective switches 64-1 to 64-6, whereby the switch 64 is switched to set the guard stage number to a specified number of 4 or more. When the counted value does not exceed the specific reference value, the comparison circuit 612 outputs signals for controlling the switches 64-1 to 64-6, whereby the switch 64 is switched to set the guard stage number to a specified number of 2 or less.

On the other hand, as soon as the registers 1-1 to 1-3 in FIG. 7 hold the low level pseudo out-of-frame signals, the forward guard unit 62 outputs a high level signal from the NOR gate 62-1 to the reset terminal R of the flip-flop circuit 6 to reset the flip-flop circuit. This causes the frame alignment signal 200 so far issued from the flip-flop circuit 6 to be changed to the low level. The change of the frame alignment signal 20 to its low level causes the gate circuit 7 to be opened and the gate circuit 8 to be closed. During the reception of the pseudo out-of-frame signal at the backward guard unit 63, the control signal 60 is a high level, during which the high level control signal 60 is applied to the enable terminal EN of the counter 9 through the gate circuit 7. For this reason, the counter 9 starts to count the clock 70 from the multi-frame counter 14 and outputs its counted value to the comparison circuit 611. The comparison circuit 611, when the received counted value exceeds a specific one of the plurality of reference values XX, e.g., 5 reference values, outputs signals for controlling the switches 65-1 to 65-6, whereby the switch 65 is switched to increase the guard stage number of the backward guard unit 63. When the received counted value does not exceed the specific reference value, the comparison circuit 611 outputs signals for controlling the switches 65-1 to 65-6, whereby the switch 65 is switched to decrease the guard stage number of the backward guard unit 63.

In this connection, in particular, in the case where the present invention is applied to a receiver in such a moving object as a mobile telephone, the reference values for the switching between the forward guard and the backward guard of the frame guard system as well as the maximum forward and backward guard stage numbers may be determined by the speed of the moving object, the communication interruption time interrupted by an average tunnel length or the like, and the data including a transmission rate in communication.

It goes without saying that it is unnecessary to set the forward guard stage number to be the backward one.

Further, the detection of the frame synchronization in the frame detector 13 can be matched to the array of the frame synchronization bits of the received signal. For example, the frame synchronization can be detected on the basis of the frame synchronization bits dispersedly arranged for the respective frames of the input signal and also can be detected on the basis of the frame synchronization bits arranged in a specified one of a plurality of unit frames in the input signal.

What is claimed is:

1. A frame guard system comprising:
   means for extracting frame synchronization bits from a received signal and for generating a frame synchronization signal when detecting a frame synchronization from the frame synchronization bits;
   means for extracting the frame synchronization bits from the received signal and for generating an out-of-frame signal when failing to detect the frame synchronization from the frame synchronization bits;
   backward guard means for outputting a frame alignment signal when the frame synchronization signal is generated continuously for a first predetermined number of times;
   forward guard means for stopping output of the frame alignment signal when the out-of-frame signal is generated continuously for a second predetermined number of times;
   first time measuring means for measuring a time after output of the frame alignment signal until the generation of the out-of-frame signal;
   second time measuring means for measuring a time after the stoppage of the output of the frame alignment signal until the generation of the frame synchronization signal;
   first control means for controllably changing the second predetermined number of times previously set at the forward guard means depending on a length of the time measured by the first time measuring means; and
   second control means for controllably changing the first predetermined number of times previously set at the backward guard means depending on a length of the time measured by the second time measuring means.

2. The frame guard system as set forth claim 1, wherein the first control means includes a first comparison circuit for comparing a value of an output signal of the first time measuring means with a first predetermined reference value applied to the first comparison means and for outputting a control signal for increasing the second predetermined number of times of the forward guard means when the value of the output signal of the first time measuring means exceeds the first reference value and for outputting a control signal for decreasing the second predetermined number of times of the forward guard means when the value of the output signal of the first time measuring means does not exceed the first reference value; and wherein the second control means includes a second comparison circuit for comparing a value of an output signal of the second time measuring means with a second predetermined reference value applied to the second comparison means and for outputting a control signal for increasing the first predetermined number of times of the backward guard means when the value of the output signal of the second time measuring means exceeds the second reference value and for outputting a control signal for decreasing the first predetermined number of times of the backward guard means when the value of the output signal of the second time measuring means does not exceed the second reference value.

3. The frame guard system as set forth claim 1, wherein the forward guard means includes a plurality of forward guard circuits for setting the second predetermined number of times to be a plurality of different fixed values so as to generate a plurality of signals used for stopping the output of the frame alignment signal in response to the plurality of different fixed values; the backward guard means includes a plurality of backward guard circuits for setting the first predetermined number of times to be a plurality of different fixed values so as to generate a plurality of signals for causing the frame alignment signal to be output in response to the plurality of different fixed values; the first control means includes first selective switching means for selectively switching the plurality of signals generated by the plurality of forward guard circuits; and the second control means includes second selective switching means for selectively switching the plurality of signals generated by the plurality of backward guard circuits.

4. The frame guard system as set forth in claim 3, wherein the plurality of forward guard circuits are a plurality of NOR circuits and the plurality of backward guard circuits are a plurality of AND circuits.

5. The frame guard system as set forth in claim 1, wherein the first time measuring means includes a gate circuit for opening its gate for a time after the output of the frame alignment signal until the generation of the out-of-frame signal, and the second time measuring means includes a second gate circuit for opening its gate for a time after the stoppage of the output of the frame alignment signal until the generation of the frame synchronization signal.

6. The frame guard system as set forth in claim 1, further comprising serial/parallel converter means for converting serial signals of the frame synchronization signal generated by the frame-synchronization-signal generating means and of the out-of-frame signal generated by the out-of-frame signal generating means into a predetermined number of parallel signals, wherein the forward guard means includes a forward guard circuit for generating a signal used for stopping the output of the frame alignment signal when the predetermined number of parallel signals correspond in number to the second predetermined number of times, the backward guard means includes a backward guard circuit for generating a signal used for outputting the frame alignment signal when the predetermined number of parallel signals correspond in number to the first predetermined number of times, the first control means includes first selective switch means for selectively switching the parallel signals converted by the serial/parallel means to output the switched signals to the forward guard means; and the second control means includes second selective switch means for selectively switching the parallel signals converted by the serial/parallel means to output the switched signals to the backward guard means.

7. The frame guard system as set forth in claim 6, wherein the forward guard circuit is a NOR circuit and the backward guard circuit is an AND circuit.

8. The frame guard system as set forth in claim 6, wherein the first control means includes a first comparison circuit for generating a control signal used for controlling the switching operation of the first selective switch means on the basis of a plurality of reference values, and the second control means includes a second comparison circuit for generating a control signal used for controlling the switching operation of the second selective switch means on the basis of a plurality of reference values.

* * * * *

UNITED STATES PATENT AND TRADEMARK OFFICE
CERTIFICATE OF CORRECTION

PATENT NO. : 5,303,270
DATED : April 12, 1994
INVENTOR(S) : Hironori FUJII

It is certified that error appears in the above-indentified patent and that said Letters Patent is hereby corrected as shown below:

Claim 6, column 10, line 67, between "parallel" and "means" insert --converter--.

Claim 6, column 11, line 3, between "parallel" and "means" insert --converter--.

Signed and Sealed this

Twenty-seventh Day of December, 1994

Attest:

BRUCE LEHMAN

*Attesting Officer*     *Commissioner of Patents and Trademarks*